US007980936B2

(12) United States Patent
Mead

(10) Patent No.: US 7,980,936 B2
(45) Date of Patent: Jul. 19, 2011

(54) APPARATUS AND METHOD FOR PLAYER INTERACTION

(75) Inventor: Randy Mead, Reno, NV (US)

(73) Assignee: IGT, Reno, NV (US)

( * ) Notice: Subject to any disclaimer, the term of this patent is extended or adjusted under 35 U.S.C. 154(b) by 1081 days.

(21) Appl. No.: 10/261,028

(22) Filed: Sep. 30, 2002

(65) Prior Publication Data

US 2004/0063486 A1 Apr. 1, 2004

(51) Int. Cl.
*A63F 13/02* (2006.01)
*A63F 13/10* (2006.01)
*A63F 5/04* (2006.01)
*G07F 17/34* (2006.01)

(52) U.S. Cl. ............................... 463/16; 463/20; 463/31

(58) Field of Classification Search .................... 463/10, 463/11, 36, 37, 43, 13–20, 29–31
See application file for complete search history.

(56) References Cited

U.S. PATENT DOCUMENTS 4,587,630 A * 5/1986 Straton et al. ................. 715/823
4,711,543 A 12/1987 Blair et al. ....................... 352/87
RE33,662 E 8/1991 Blair et al. .................... 364/410
5,053,758 A * 10/1991 Cornett et al. ................ 345/174
5,100,137 A 3/1992 Fulton
5,152,529 A 10/1992 Okada
5,239,464 A 8/1993 Blair et al. .................... 364/410
5,327,160 A * 7/1994 Asher ........................... 345/156
5,376,946 A * 12/1994 Mikan ........................... 345/157
5,431,408 A 7/1995 Adams
5,511,781 A 4/1996 Wood et al.
5,618,232 A * 4/1997 Martin ............................ 463/25
5,633,993 A 5/1997 Redmann et al.
5,695,188 A 12/1997 Ishibashi
5,699,323 A * 12/1997 Nohara et al. ................ 368/187
5,704,835 A 1/1998 Dietz, II .......................... 463/20
(Continued)

FOREIGN PATENT DOCUMENTS

EP 0 840 256 5/1998
(Continued)

OTHER PUBLICATIONS

IBM Technical Disclosure Bulletin, May 1, 1993, vol. 36, issue 15, pp. 15-18, cross-reference 0018-8689-36-5-15.*
(Continued)

*Primary Examiner* — David L Lewis
*Assistant Examiner* — Matthew D. Hoel
(74) *Attorney, Agent, or Firm* — Armstrong Teasdale LLP

(57) ABSTRACT

A gaming apparatus includes a display unit that is capable of generating video images, a value input device, and a controller operatively coupled to the display unit and the value input device, the controller comprising a processor and a memory operatively coupled to the processor. The controller is programmed to allow a person to make a wager, to cause a first video image to be generated on the display unit, the first video image representing a first video game, to determine a game event associated with the first video game, to cause a second video image representing a second video game to be generated on the display unit according to the game event associated with the first video game, to animate the second video image, to receive a player's input to stop animation of the second video image, to stop animation of the second video image according to the player's input, and to determine a value payout to be associated with the second video game.

39 Claims, 15 Drawing Sheets

U.S. PATENT DOCUMENTS

| | | | | |
|---|---|---|---|---|
| 5,766,074 | A | 6/1998 | Cannon et al. | |
| 5,807,177 | A | 9/1998 | Takemoto et al. | |
| 5,844,547 | A * | 12/1998 | Minakuchi et al. | 345/173 |
| 5,855,515 | A | 1/1999 | Pease et al. | |
| 5,876,284 | A | 3/1999 | Acres et al. | |
| 5,882,259 | A | 3/1999 | Holmes, Jr. et al. | |
| 5,931,467 | A | 8/1999 | Kamille | |
| 5,967,518 | A | 10/1999 | Rowe | |
| 6,027,115 | A | 2/2000 | Griswold et al. | |
| 6,033,307 | A | 3/2000 | Vancura | |
| 6,048,269 | A | 4/2000 | Burns et al. | |
| 6,050,895 | A | 4/2000 | Luciano et al. | |
| 6,089,976 | A | 7/2000 | Schneider et al. | 463/16 |
| 6,089,977 | A | 7/2000 | Bennett | |
| 6,102,798 | A | 8/2000 | Bennett | 463/16 |
| 6,120,031 | A | 9/2000 | Adams | |
| 6,142,873 | A | 11/2000 | Weiss et al. | |
| 6,159,097 | A * | 12/2000 | Gura | 463/20 |
| 6,203,429 | B1 | 3/2001 | Demar et al. | |
| 6,213,875 | B1 | 4/2001 | Suzuki | |
| 6,224,482 | B1 | 5/2001 | Bennett | |
| 6,251,013 | B1 | 6/2001 | Bennett | 463/13 |
| 6,270,411 | B1 * | 8/2001 | Gura et al. | 463/20 |
| 6,279,902 | B1 | 8/2001 | Yamazaki et al. | |
| 6,290,600 | B1 | 9/2001 | Glasson | |
| 6,309,300 | B1 | 10/2001 | Glavich | |
| 6,309,301 | B1 | 10/2001 | Sano | |
| 6,319,124 | B1 | 11/2001 | Baerlocher et al. | |
| 6,375,567 | B1 * | 4/2002 | Acres | 463/25 |
| 6,375,570 | B1 * | 4/2002 | Poole | 463/31 |
| 6,411,276 | B1 | 6/2002 | Braun et al. | |
| 6,517,432 | B1 | 2/2003 | Jaffe | |
| 6,537,150 | B1 | 3/2003 | Luciano et al. | |
| 6,551,187 | B1 | 4/2003 | Jaffe | |
| 6,554,704 | B2 * | 4/2003 | Nicastro et al. | 463/20 |
| 6,558,254 | B2 | 5/2003 | Baerlocher et al. | |
| 6,561,900 | B1 | 5/2003 | Baerlocher et al. | |
| 6,565,434 | B1 | 5/2003 | Acres | |
| 6,692,356 | B2 | 2/2004 | Baerlocher et al. | |
| 6,731,313 | B1 * | 5/2004 | Kaminkow | 715/839 |
| 6,786,818 | B1 | 9/2004 | Rothschild et al. | |
| 6,916,243 | B2 * | 7/2005 | Yoshida | 463/20 |
| 6,918,834 | B2 * | 7/2005 | Vancura | 463/25 |
| 6,926,609 | B2 * | 8/2005 | Martin | 463/36 |
| 2001/0021666 | A1 * | 9/2001 | Yoshida et al. | 463/20 |
| 2002/0016200 | A1 * | 2/2002 | Baerlocher et al. | 463/20 |
| 2002/0155881 | A1 * | 10/2002 | Yoshida | 463/20 |
| 2002/0183105 | A1 * | 12/2002 | Cannon et al. | 463/16 |
| 2003/0017865 | A1 * | 1/2003 | Beaulieu et al. | 463/16 |
| 2003/0027619 | A1 * | 2/2003 | Nicastro, Sr. | 463/16 |
| 2003/0064782 | A1 | 4/2003 | Beaulieu et al. | |
| 2003/0064802 | A1 | 4/2003 | Rodgers et al. | |
| 2003/0069063 | A1 * | 4/2003 | Bilyeu et al. | 463/20 |
| 2004/0048646 | A1 * | 3/2004 | Visocnik | 463/16 |
| 2004/0092315 | A1 * | 5/2004 | Boyd et al. | 463/42 |

FOREIGN PATENT DOCUMENTS

| | | | |
|---|---|---|---|
| EP | 1 054 368 | | 11/2000 |
| EP | 1 082 979 | | 3/2001 |
| EP | 1 082 979 | A2 * | 3/2001 |
| EP | 1 083 531 | | 3/2001 |
| EP | 1 205 894 | | 5/2002 |
| GB | 2 144 644 | | 3/1985 |
| GB | 2 193 441 | | 2/1988 |
| WO | WO 99/10849 | | 3/1999 |
| WO | WO 00/32286 | | 6/2000 |
| WO | WO 01/74464 | | 10/2001 |
| WO | WO 03/030116 | | 4/2003 |

OTHER PUBLICATIONS

IBM Technical Disclosure Bulletin, May 1st, 1993, vol. 36, issue 15, pp. 15-18, cross-reference 0018-8689-36-5-15.*

Frank Legato, Creepy and Kooky IGT's "The Addams Family" mines '60s-sitcom culture to create a wildly entertaining slot, Strictly Slots (Jul. 2000).

Break the Spell, Atronic Casino Technologies, Strictly Slots (Sep. 2000).

Morph' un™, Spintek Gaming Technologies, Inc. (2000).

Bally Gaming Systems, Cash Encounters (2001).

Adams Family, IGT, (1999).

Asteroids, Atari Inc., single page (circa 1979).

Break the Spell, Atronic, single page (webpage visited on May 14, 2002) (http://www.atronic.com/products/videoslots/breakthespell/content.shtml).

"Break the Spell, Atronic Casino Technologies," Strictly Slots, single page (Sep. 2000).

Cash Encounters, Bally, single page (webpage visited on Dec. 17, 2001) (http://www.ballygaming.com/gameroom/video/cash__ecounters.asp).

Kansil, "Bicycle, Official Rules of Card Games", The United States Playing Card Company, $90^{th}$ Ed., 71-72 (2001).

Legato, "Creepy and Kooky; IGT's 'The Addams Family' mine '60s-sitcom culture to create a wildly entertaining slot," Strictly Slots, vol. 2, No. 8 (Jul. 2000).

Morph'un, Spintek, single page (2000).

Namco ITU trademark application, single page (Jul. 11, 2000).

U.S Appl. No. 09/686,308 "Gaming Device Having Interacting Symbols" (filed Oct. 11, 2000).

* cited by examiner

APPARATUS AND METHOD FOR PLAYER INTERACTION

BACKGROUND

The present disclosure is directed to a method and apparatus for a gaming machine, and in particular a method and apparatus for player interaction in a gaming machine.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
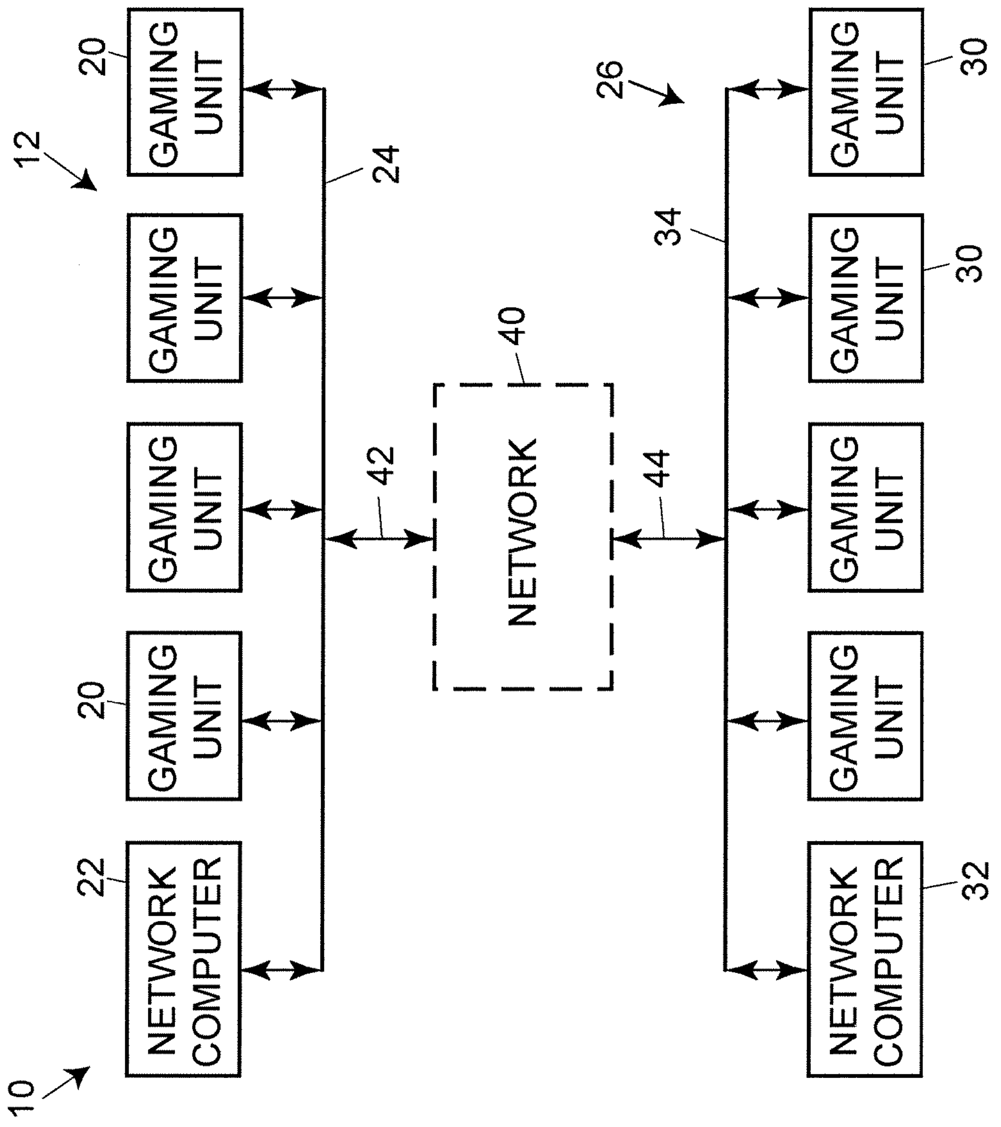
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
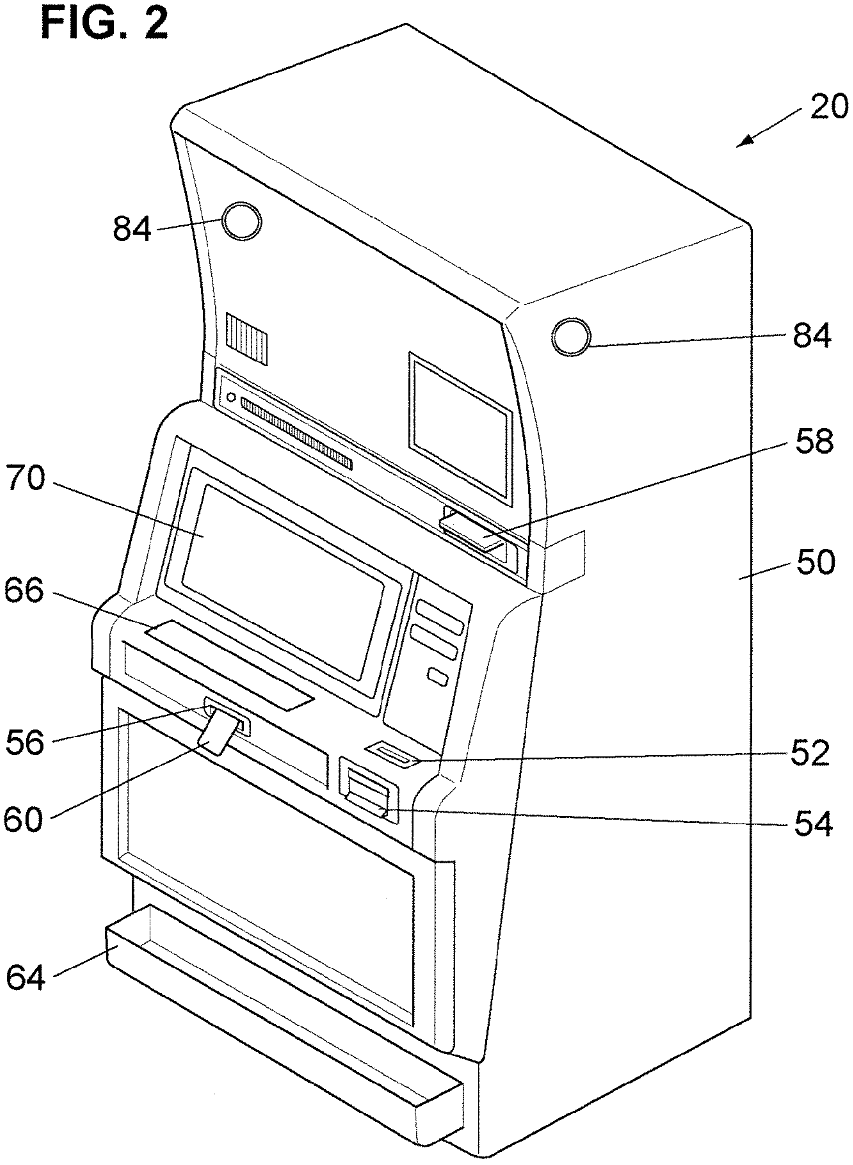
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or to write data to, player tracking cards that are capable of storing data representing the identity of a player, the identity of a casino, the player's gaming habits, etc. The card reader 58 may also be used to read data from, and/or to write data to, a card that is capable of storing data representing value awarded to the player based on game play for later use or redemption.

The gaming unit 20 may include value output devices other than the ticket reader/printer 56 and card reader 58. For example, the gaming unit 20 may include one or more hoppers (not shown) associated with the gaming unit 20. The one or more hoppers may dispense value into a tray 64 disposed at the front of the housing 50. The value may be in the form of coins or tokens, or may be in the form of tangible items, such as jewelry, game play tickets or tokens, merchandise tickets or tokens, restaurant tickets or tokens, show tickets or tokens or the like, disposed in a capsule or cover.

Figure 2A:
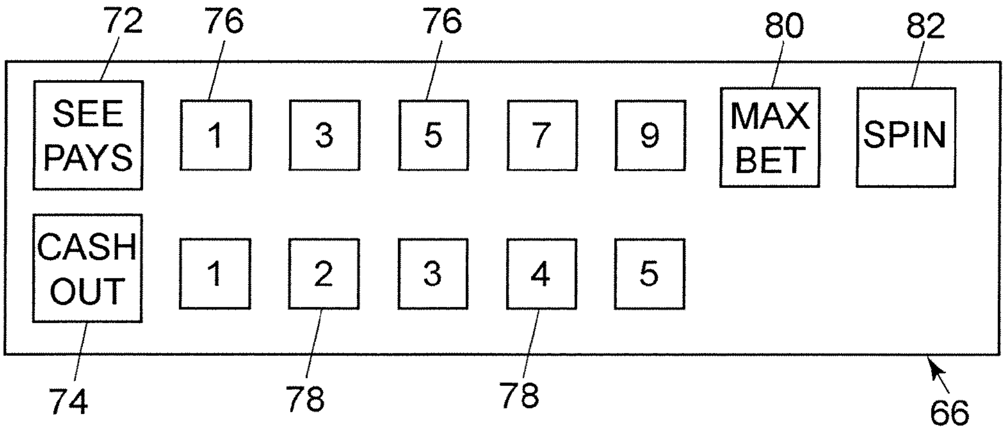
FIG. 2A illustrates an embodiment of a control panel for a gaming unit.

The gaming unit 20 may also include an input control panel 66. The input control panel 66 may be provided with a plurality of pushbuttons or touch sensitive areas that may be pressed by a player to select games, make wagers, make gaming decisions, etc. FIG. 2A illustrates one possible embodiment of the control panel 66, which may be used where the gaming unit 20 is a slot machine having a video output device in the form of a color video display unit 70 for displaying images of slot machine reels. While such an example is discussed herein, the gaming unit 20 is not limited to slot machines with video display unit outputs, but may include other forms of machines with video display unit outputs (e.g., video poker machines) or other forms of slot machines (e.g., slot machines with mechanical reels).

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen or touch-sensitive pads.

The gaming unit 20 may include one or more audio output devices 84. The audio output devices 84 may be speakers, and may be capable of providing sounds that emanate or appear to emanate from a single point, that emanate or appear to emanate from multiple points, or that vary or appear to vary their point of emanation in two dimensional or three dimensional space. Other types of audio output devices 84 may include whistles, buzzers, bells, chimes, horns, etc. The audio output devices 84 may generate audio sound segments representing sounds such as the noise of spinning slot machine reels, a dealer's voice, music, announcements, etc.

Gaming Unit Electronics

Figure 3:
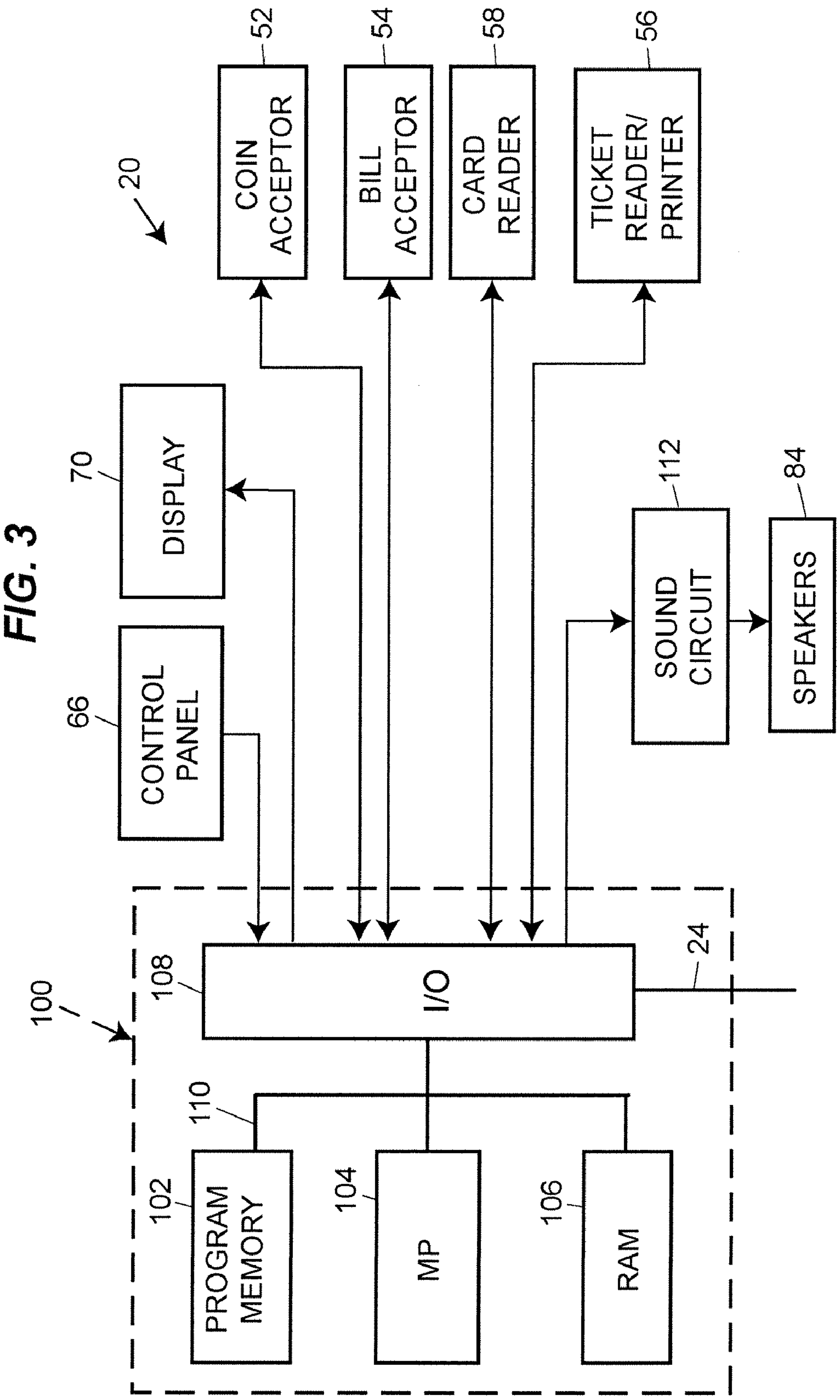
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the coin acceptor 52, the bill acceptor 54, the ticket reader/printer 56, the card reader 58, the control panel 66, and the display unit 70 may be operatively coupled to the I/O circuit 108, each of those components being so coupled by either a unidirectional or bidirectional, single-line or multiple-line data link, which may depend on the design of the component that is used. The audio output devices 84 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
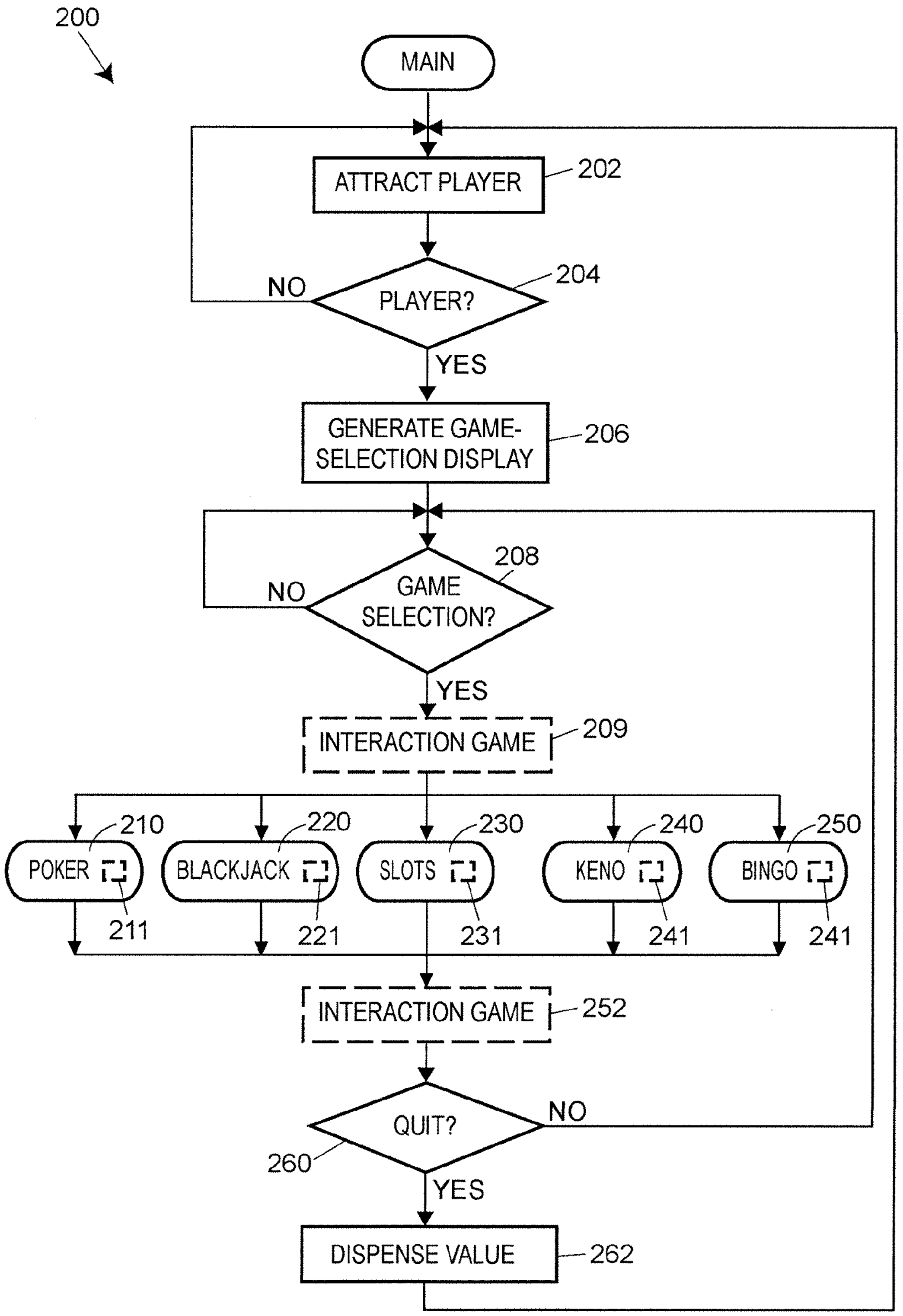
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

A game-selection display may be generated on the display unit 70 at block 206 to allow the player to select a game available on the gaming unit 20. The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection.

Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

An optional player interaction game may be inserted in the routine 200 prior to, during, or after the performance of the video poker routine 210, the video blackjack routine 220, the slots routine 230, the video keno routine 240 or the video bingo routine 250, as indicated by the blocks 209, 211, 221, 231, 241, 251, 252 outlined in dashed line in FIG. 4. The player interaction games 209, 211, 221, 231, 241, 251, 252 may be either in response to a wager or gratis (for example, as an incentive to participate in or for participation in a player rewards program or as part of a bonus round where the player has achieved a particular game event or game outcome). The player interaction game 209 may, for example, determine a multiplier to be used if the outcome of the routine 210, 220, 230, 240, 250 results in a value payout to the player. Alternatively, the player interaction game 209 may determine an additional payout if the outcome of the routine 210, 220, 230, 240, 250 is a particular combination of game elements (e.g., a particular sequence of reel symbols, a particular hand of cards, a particular pattern of keno spots, etc.), or if the outcome results in a zero payout or the maximum payout. The player interaction games 211, 221, 231, 241, 251 may be played at the same time as the games 210, 220, 230, 240, 250 to fill time between game events, for example, during the re-deal in a game of video poker or during the time the player is waiting for a keno drawing to occur or between the calls of a bingo game. The player interaction game 252, like the player interaction game 209, may determine a multiplier or additional payout, for example as part of a bonus game (e.g., where the player has achieved a particular game event during the game 210, 220, 230, 240, 250, such as a particular reel symbol or series of symbols, particular card or hand, or keno spot or pattern of spots, or a particular game outcome, such as a particular series of symbols on all reels, a particular winning hand or a complete match of all the keno spots selected).

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
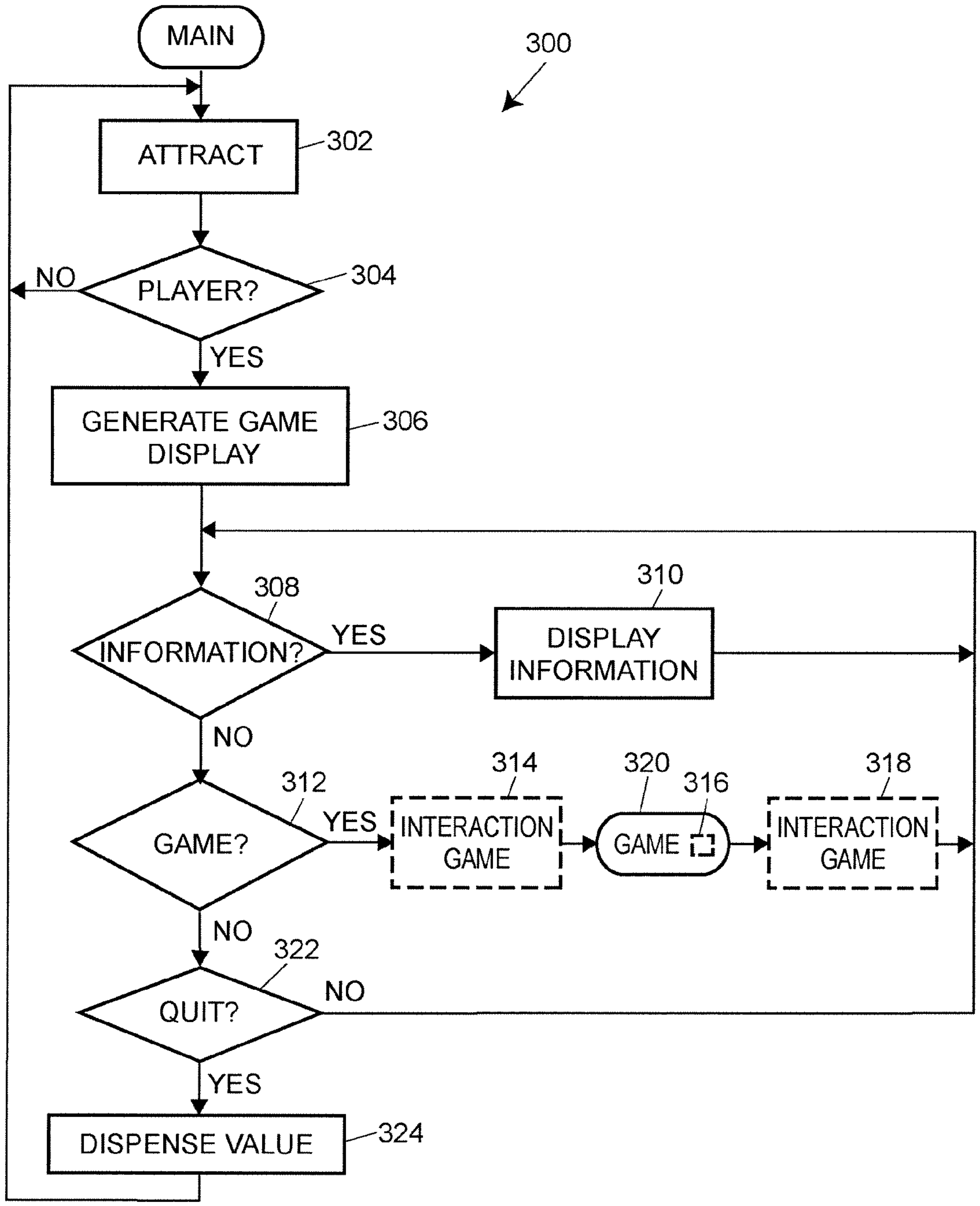
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 84.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

Similar to the routine 200 discussed above, the routine 300 may include a player interaction game 314, 316, 318 before, during or after the game routine 320. Also, as discussed above, the player interaction game 314, 316, 318 may be performed after a wager is received or gratis. In fact, the statements made above regarding the player interaction games 209, 211, 221, 231, 241, 251, 252 may apply to the player interaction games 314, 316, 318 as well.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 6:
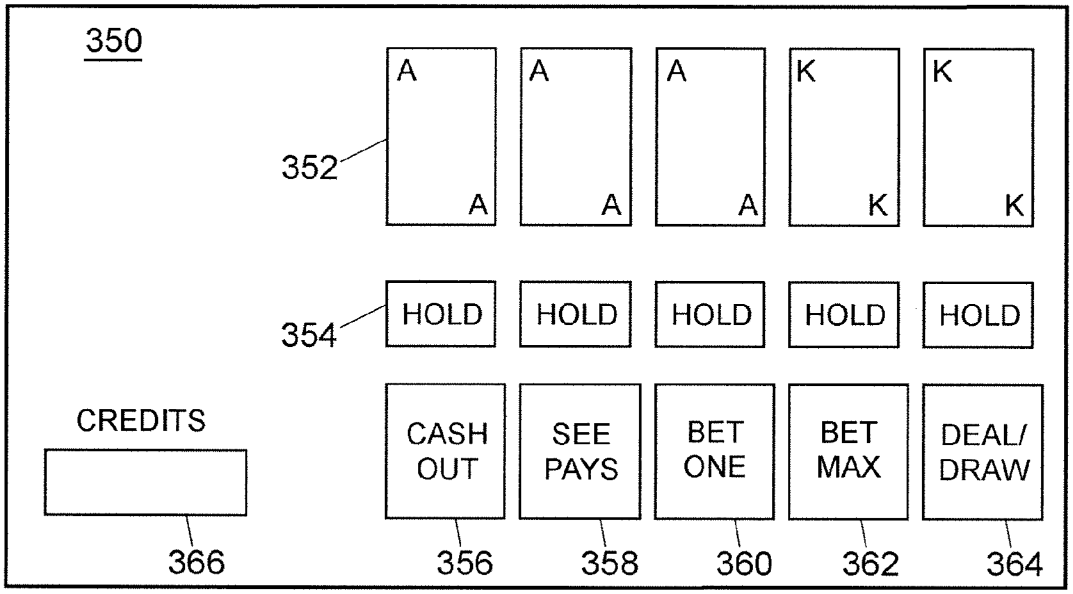
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
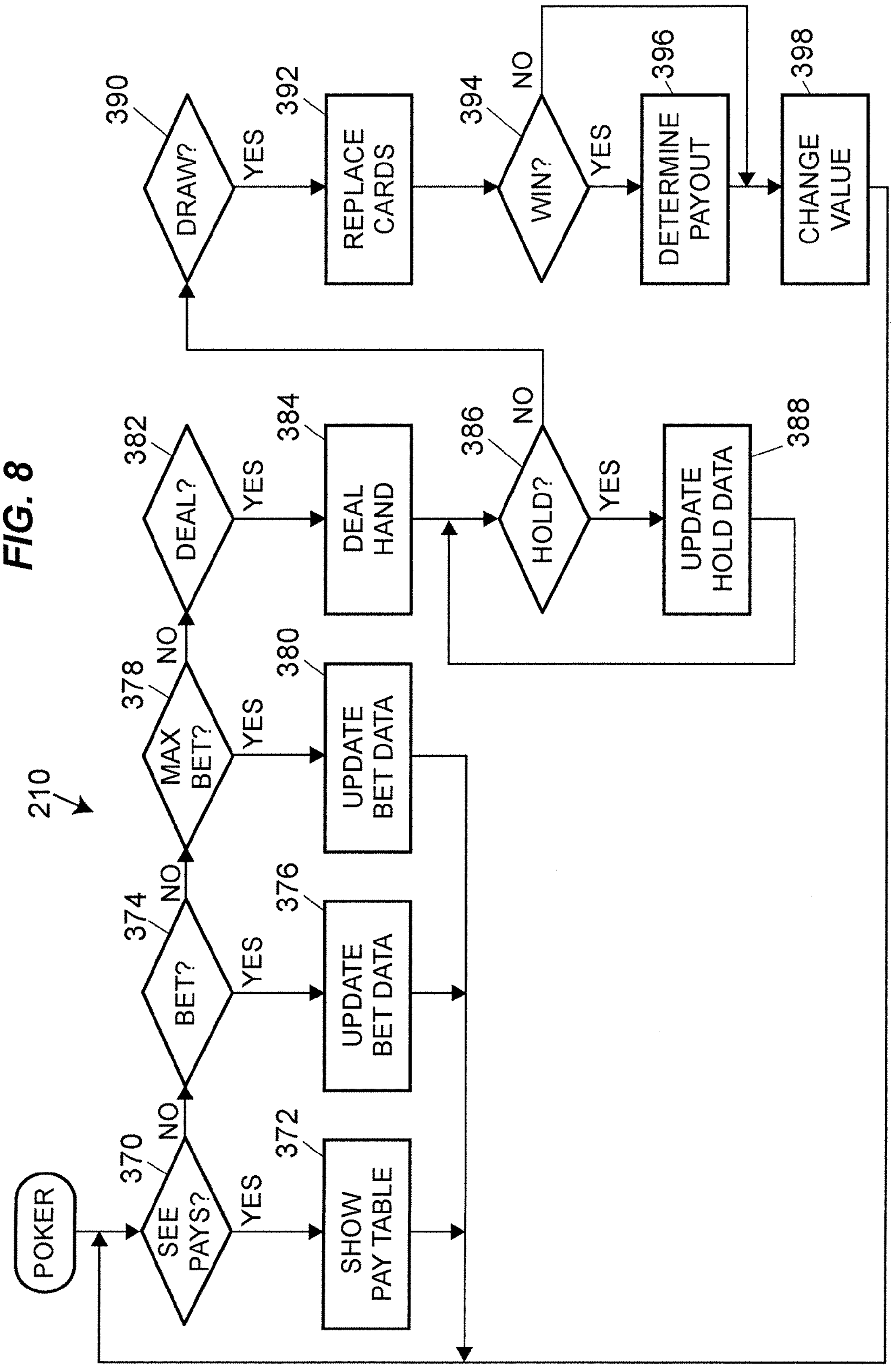
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
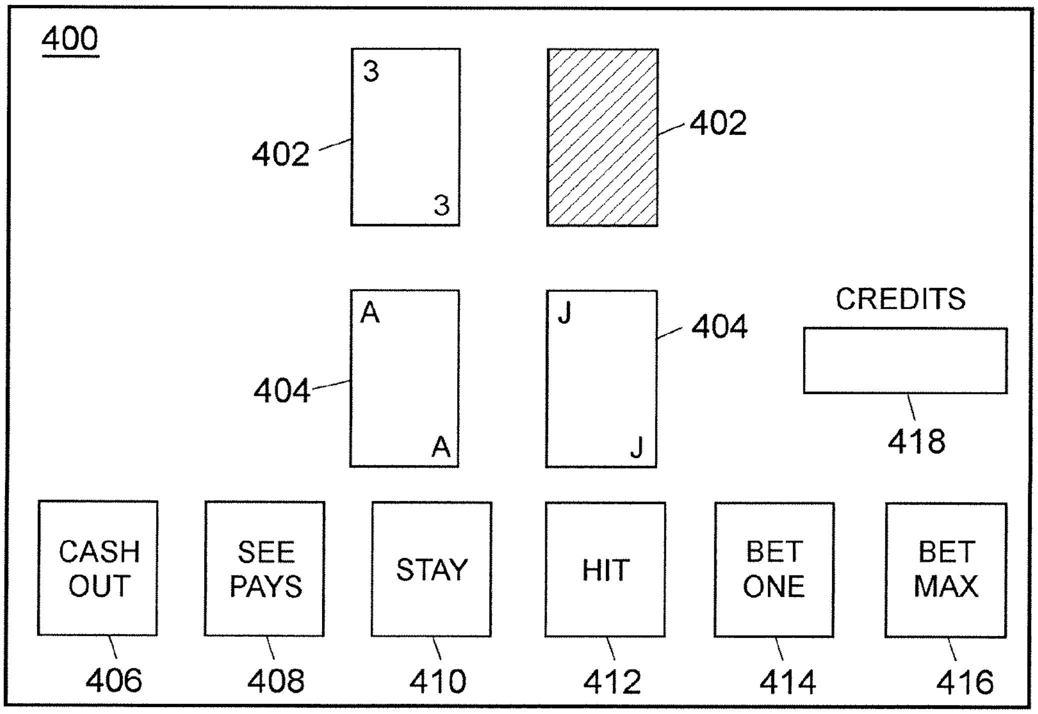
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
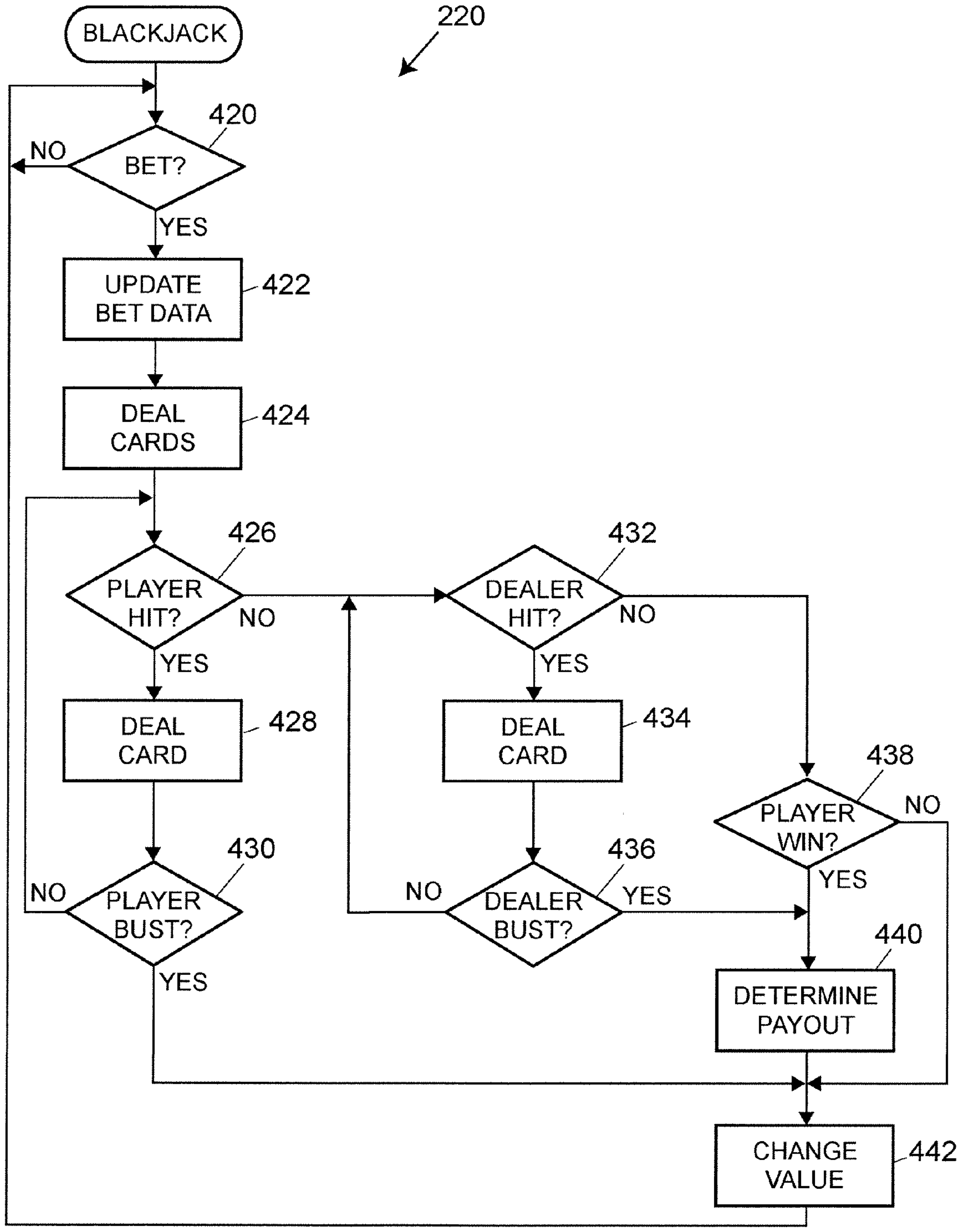
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

Figure 10:
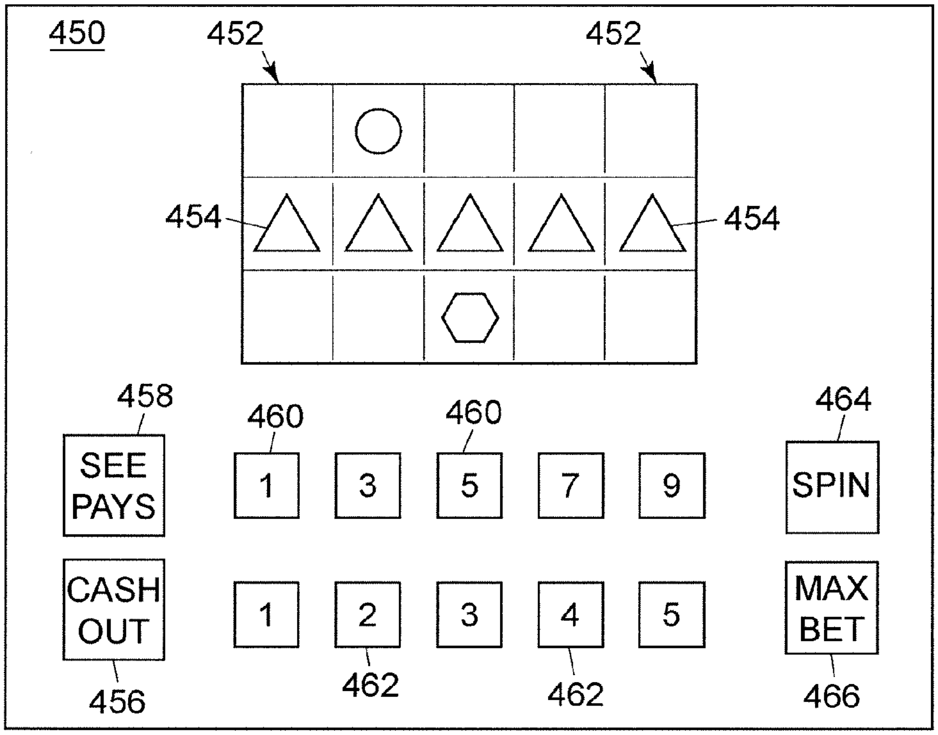
FIG. 10 is an illustration of an embodiment of a visual display that may be displayed during performance of the slots routine of FIG. 12.

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
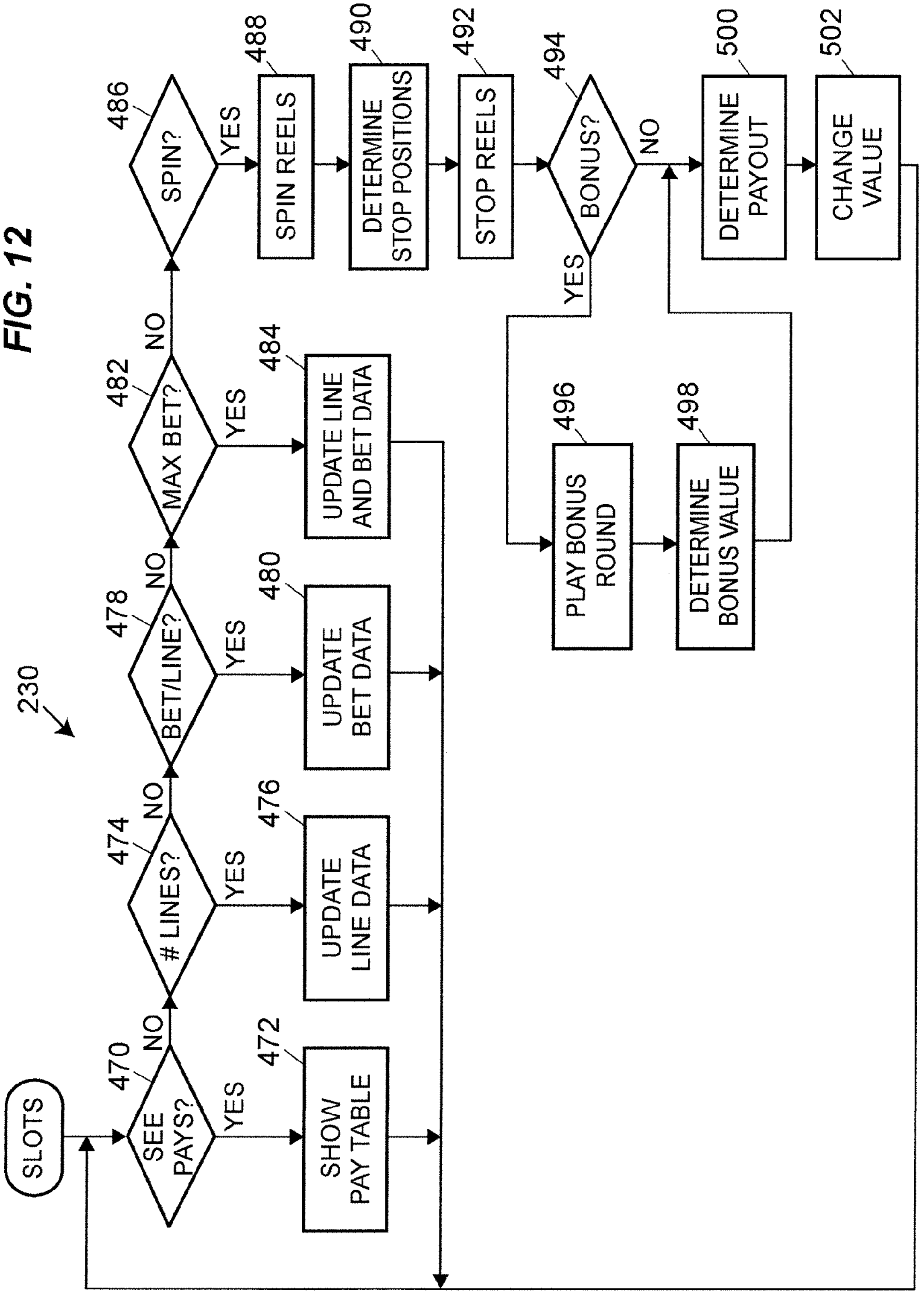
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. For example, the bonus round may be a player interaction game, such as is explained in greater detail below. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

Figure 11:
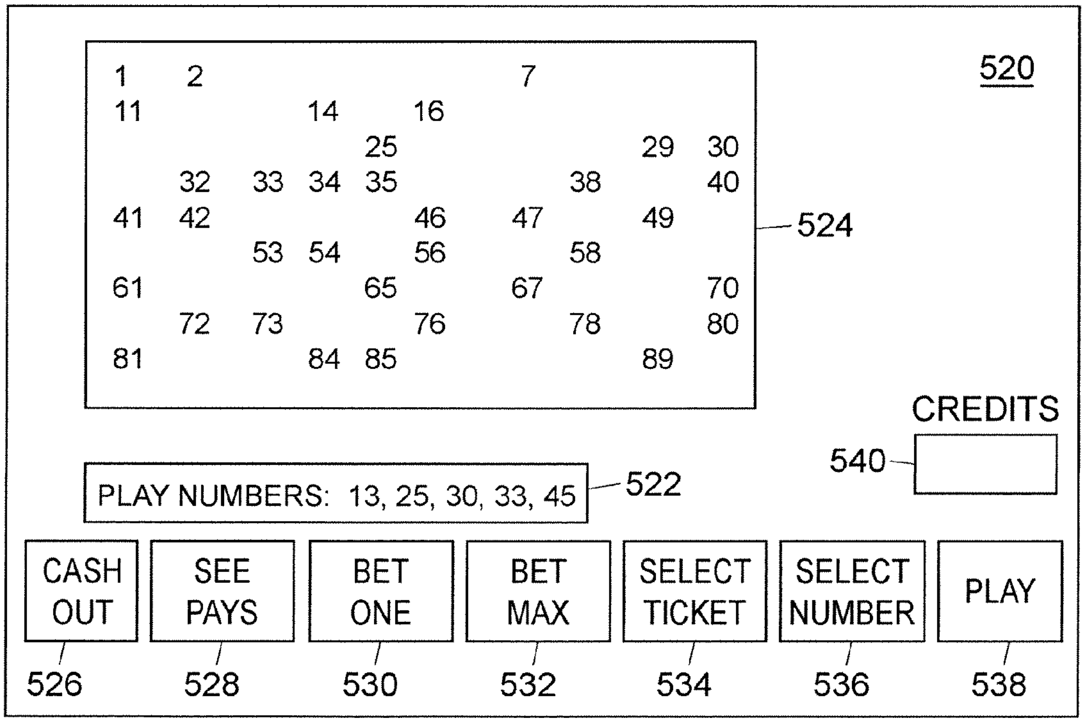
FIG. 11 is an illustration of an embodiment of a visual display that may be displayed during performance of the video keno routine of FIG. 13.

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
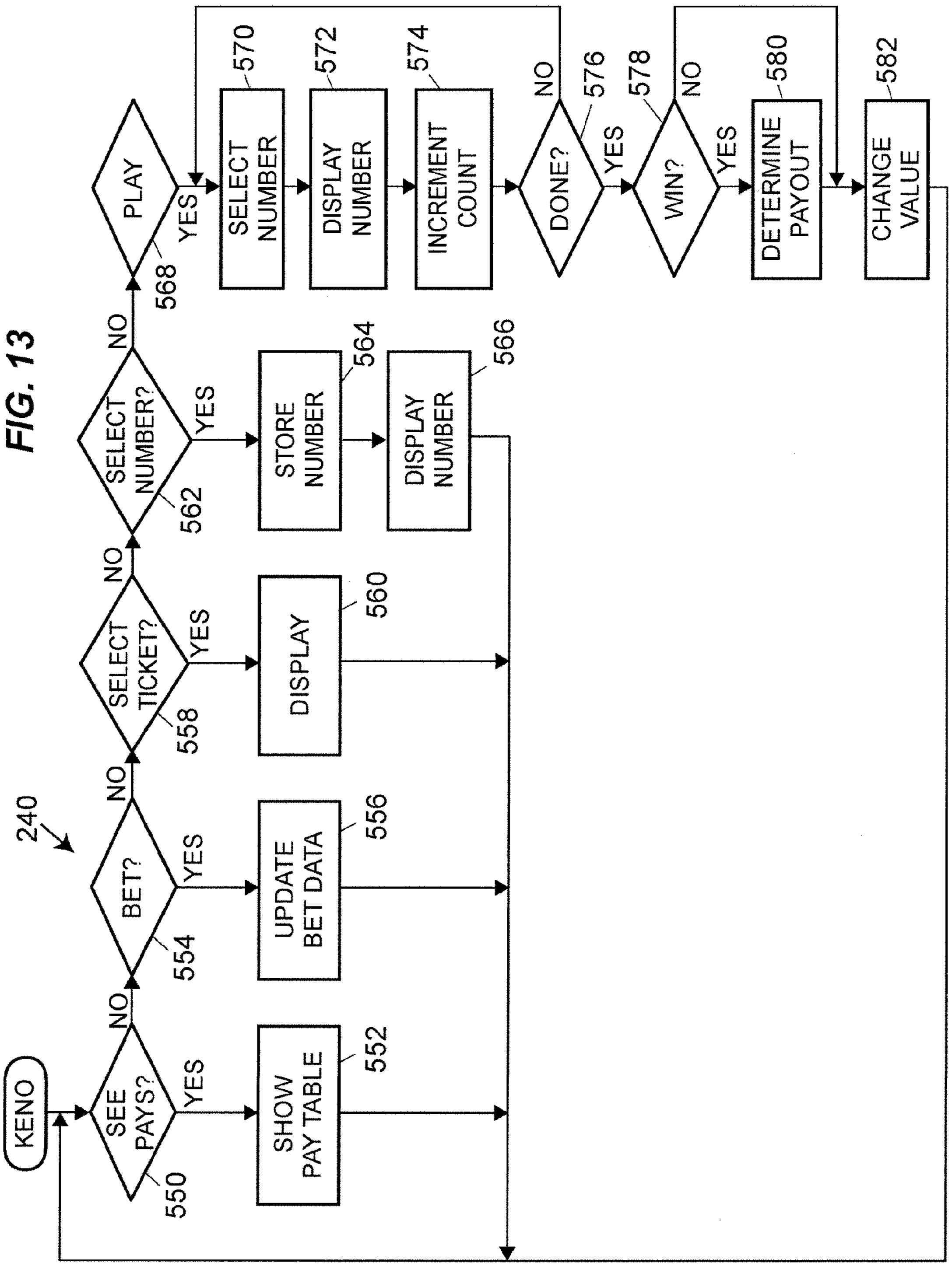
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
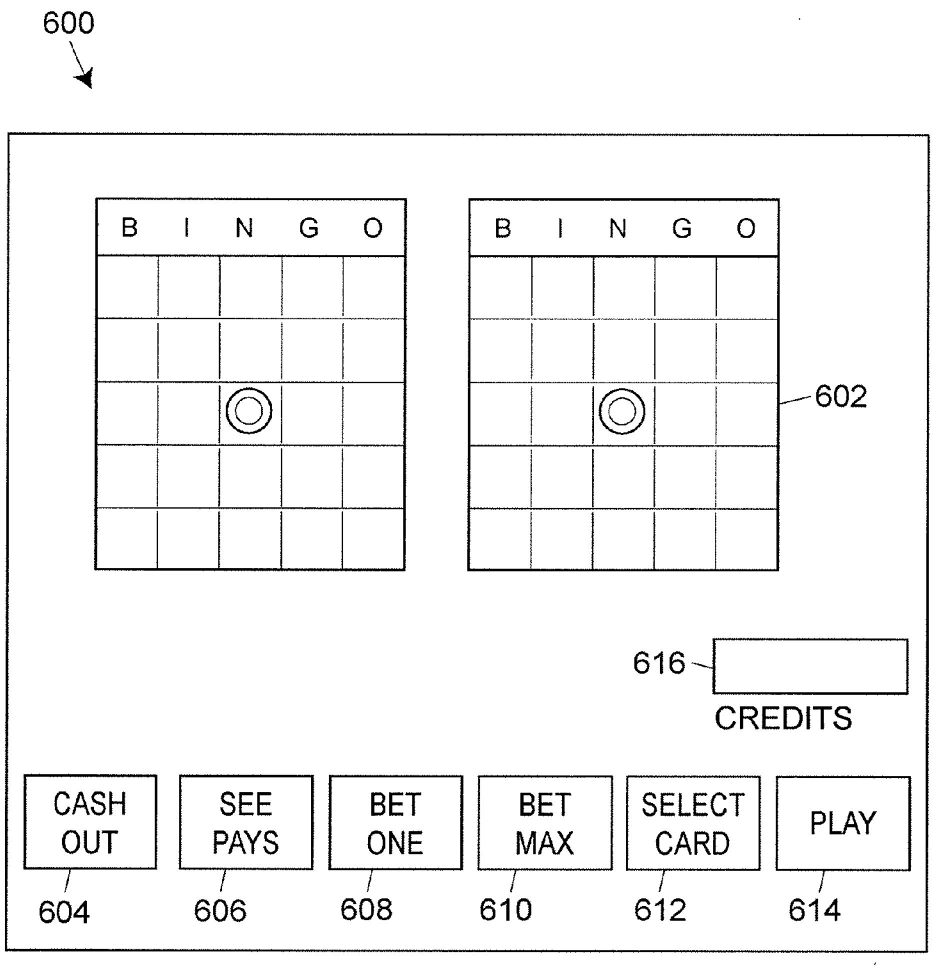
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
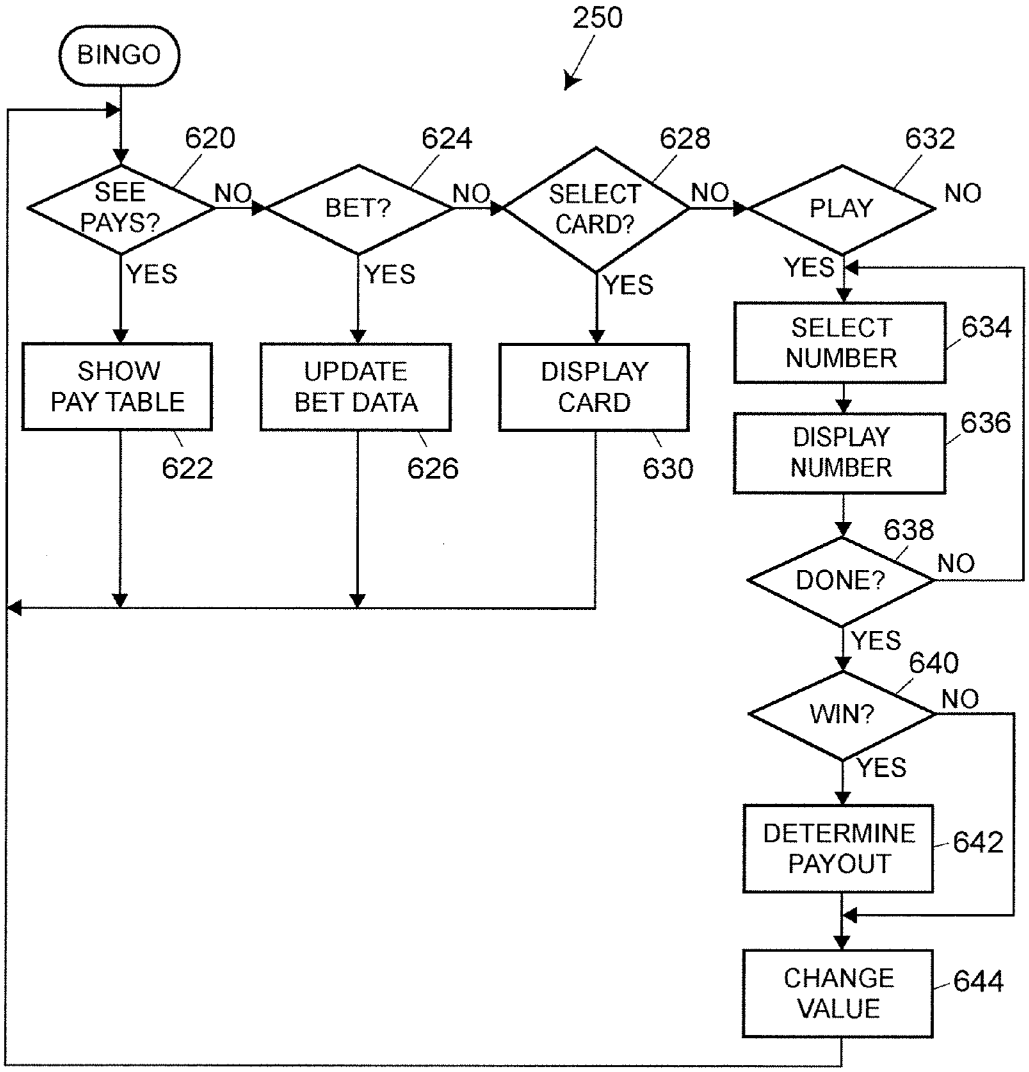
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Player Interaction Game Routine

Figure 16:
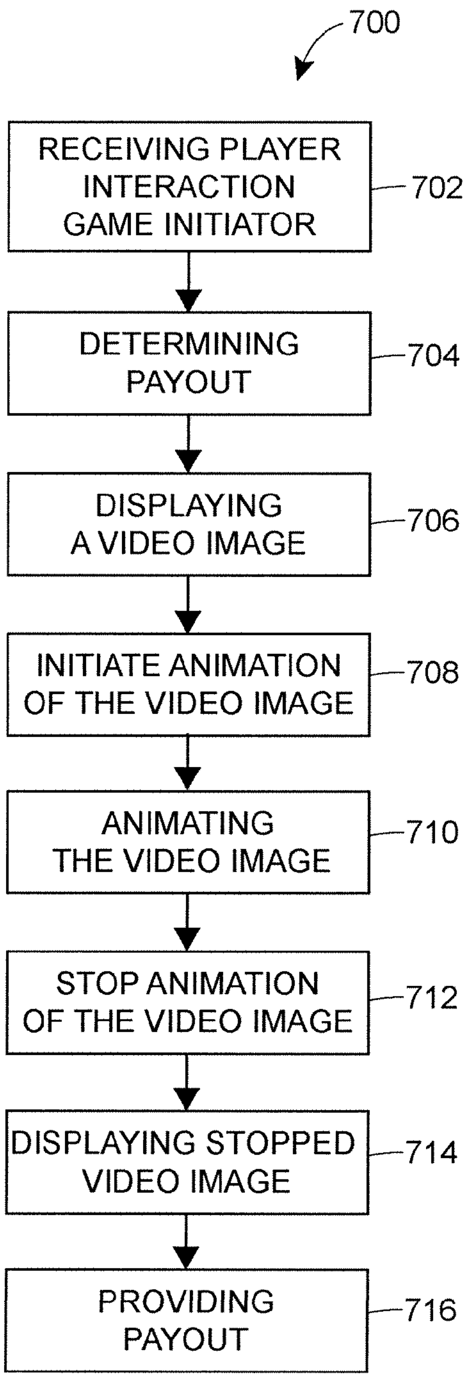
FIG. 16 is a flowchart of an embodiment of a player interaction game routine that may be performed by one or more of the gaming units.

A routine 700 for playing a player interaction game may be shown in FIG. 16. The routine may start at a block 702, where a player interaction game initiator may be received. The player interaction game initiator may be caused by many different game events. For example, where the routine 700 forms a bonus game, in whole or in part, the player interaction game initiator may be caused when the processor determines that a particular game element or a particular game outcome will be displayed. For example, in a slots game, the player interaction game initiator may be caused when the processor determines that a special reel symbol will be displayed on one or more of the reels or a series of reel symbols is displayed. As a further example, where a game theme may involve camping, the player interaction game initiator may be caused by a "marshmallow" reel symbol appearing on one or more of the reels (e.g., reels 1, 3 and 5).

At a block 704, the routine may determine the payout to be associated with the player interaction game. In this form of the player interaction game, with the payout determined before the game begins, the animation of a video image may be used to the give the player the appearance of control, even though the outcome has already been decided. It is believed that players may be more willing to play a game that provides at least the appearance of control as opposed to a game where there is no player interaction. On the other hand, the determination of the payout may be made during the animation of the video image, or even after the animation of the video image is complete.

Figure 17A:
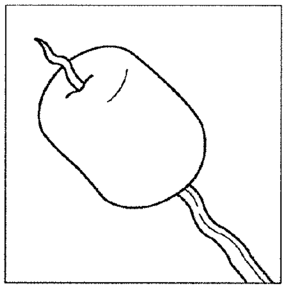
FIGS. 17A-H are illustrations of an embodiment of a visual display that may be displayed during performance of the player interaction game routine of FIG. 16.
Figure 17B:
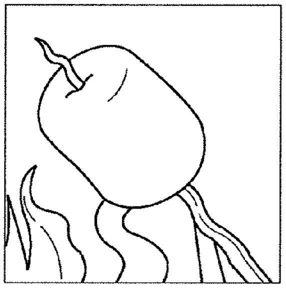
Figure 17C:
Figure 17D:
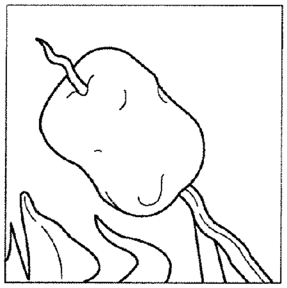
Figure 17E:
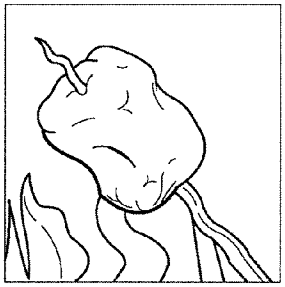
Figure 17F:

The routine proceeds to a block 706, where a video image may be displayed to the player. The video image may be generated on the video display unit 70 according to the programming of the controller 100. The video image may be animated according to the following steps, and in keeping with the camping theme noted above, may be in the form of a marshmallow, as shown in FIG. 17A.

At a block 708, the animation of the video image may be initiated. The initiation of the animation of the video image may be coupled with a player input that is associated with the player's desire or intent to initiate animation of the video image. In this regard, many different inputs may be used by the player to indicate his or her desire to begin the animation. For example, the player may be prompted to apply a finger to a touch screen or pad disposed over or proximate to the video image to start the animation of the video image, for example through the use of textual messages and/or sound effects. Alternatively, a button or lever on the control panel 66 may be used by the player to indicate his or her desire to start the animation. As a further alternative, the initiation of the animation of the video image may occur without any player input whatsoever. In particular, the animation of the video image may occur if a player input has not been received within a certain time period measured from the game event that triggered the initiation of the player interaction game routine 700.

Figure 17G:

The routine may proceed to block 710, where the video image displayed at block 708 is animated. The animation of the video image may show the item represented by the video image going through a series of stages from one state to another. For example, in keeping with the camping theme discussed above, the video image of the marshmallow displayed may be animated to show the progression of a marshmallow as if it were being cooked over a campfire. In such an example, the marshmallow may start out white and solid (FIG. 17A) and progress through a state wherein the marshmallow is golden brown and gooey to a final state wherein the marshmallow is blackened, charred lump (FIG. 17G). The progression is illustrated in FIGS. 17B-F. Alternatively, the video image may show the item represented by the video image in motion. For example, where the video image is of an odometer or a lock, the individual tumblers of the odometer or lock may rotate cycling through a series of numbers rather than progressing from one state to another.

At a block 712, the animation of the video image may be stopped. As was the case with the initiation of animation, the player may provide an input to indicate his or her desire or intent to stop or terminate animation, and this may be done in a variety of ways. Alternatively, the animation may be stopped even if the player has not signaled his or her desire to have the animation stop.

As an example of the former (based on player input), where the player was prompted to initiate animation by placing his or her finger on a touch screen or pad, the animation may proceed until the player lifts his or her finger off of the touch screen or pad, the removal of the finger being associated with a desire to stop the animation. Alternatively, the player may touch the touch screen or pad once to start the animation, remove his or her finger during the animation, and touch the touch screen or pad again to stop the animation. As a further alternative, where the animation was initiated without a player's input, the receipt of a player input (such as a finger applied to a touch screen or pad) may indicate the player's desire to stop the animation.

As an example of the latter (not based on player input), the controller 100 may be programmed to terminate the animation of the video image after a certain amount of time has elapsed. The amount of time may coincide with the item represented by the video image completing the transition from one state to another. For example, where the video image represents a marshmallow and the animation represents the marshmallow cooking from a fresh state to a charred state, once a sufficient amount of time has elapsed to show the transition from fresh to charred, the controller 100 may terminate the animation, despite the fact that the player has not yet signaled his or her desire or intent to have the animation stop (e.g., by placing his or her finger on the touch screen or pad, or by removing his or her finger from the touch screen or pad). The stopping of the animation in such a case may be combined with the generation of a sound effect.

At block 714, the stopped video image may be displayed. The video image displayed at this point differs from that displayed in block 706 according to the animation that has taken place. For example, returning the marshmallow example, the video image displayed at block 706 may be of a white, solid marshmallow (FIG. 17A), while the video image displayed at block 714 may be of a blackened, charred lump (FIG. 17G).

Figure 17H:
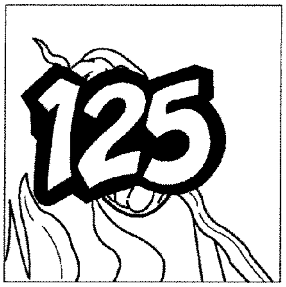

The player may be provided with a payout at block 716. When the payout is provided to the player, a visual indication of the payout may also be generated. For example, an indication of the payout may be substituted for or displayed over the video image that was animated in the preceding steps. That is, a number representing the amount of value (e.g., credits or currency) or a multiplier may be displayed over the image of the marshmallow (as in FIG. 17H). Alternatively, the video image may be displayed on the screen while a representation of the amount of value to be provided as a payout is display elsewhere on the video display unit 70, by incrementing a credit counter, for example. The payout may be provided to the player immediately after the animation of the video image stops, or there may be a lapse of time between the stop of the animation and the providing of the payout.

The routine 700 is now further explained by discussing two examples, starting with block 702 and ending with block 716.

Returning to the camping theme, as part of the play of a video slots routine 230, one or more "marshmallow" reel symbols may be displayed, thus initiating the player interaction game routine 700 as part of a bonus round at block 702. A payout may be determined (e.g. 125 game credits) at block 704. The marshmallow video images may be displayed as one or more of the reel symbols at block 706 with the other symbols are faded. The display of the marshmallow video images may be combined with the generation of a sound effect ("Let's get cookin'!", "Just touch that marshmallow to start cookin'!" and/or "Select one 'o them marshmallows to start the bonus.") and a textual message ("Select a marshmallow" and "To cook, press and hold the marshmallow symbol"). The player may then place his or her finger on a touch screen or pad oriented over one of the video images of the marshmallows at block 708, and the animation of the marshmallow begins at block 710. The animation may be accompanied by a sound effect, such as a sizzling sound. When the player thinks he or she has "cooked" his or her marshmallow "just right," the player may remove his or her finger at block 712, and the stopped video image is displayed at block 714. The animation may also be stopped if the player has "cooked" her marshmallow to a black lump. A sound effect ("Mmmmm, perfect!" or "Mmmmm, just right!") may be generated. A payout is provided at block 716 by displaying a video image of "125 CREDITS" over the video image of the marshmallow (see FIG. 17H), and the game credit indicator is incremented upward by 125 credits. The credit amounts associated with the other marshmallow video images may be shown as well.

Alternatively, an automobile theme may be used. As part of a video slots routine 230, a reel symbol representing a sleazy-looking used car salesman may appear and a sound effect may be generated asking the player "to step on back to the garage," thus initiating the player interaction game routine 700. A payout may be determined (e.g. 200 credits) at block 704. An odometer video image may be displayed at block 706 with "999_999" miles showing. The display of the odometer may be combined with the generation of a sound effect: "Turn it back; everybody does it! Touch the odometer when you think it's been turned back far enough!" The controller 100 may then initiate the animation of the video image of the odometer at block 708, and the tumblers of the odometer may spin around and around at block 710. When the player thinks just the right amount of mileage has been removed from the odometer, the player places his or her finger on a touch screen or touch pad oriented over the video image of the odometer at block 712, and the animation stops at block 714. The odometer now reads "2_X__100" at block 716. A sound effect ("Thanks pal!") may also be generated at block 716.

What is claimed is:

1. A gaming apparatus, comprising:

a display unit that is capable of generating video images;

a value input device;

a controller operatively coupled to said display unit and said value input device, said controller comprising a processor and a memory operatively coupled to said processor, said controller being programmed to allow a player to make a wager, said controller being programmed to cause a first video image representing a first video game to be generated on said display unit, said first video image representing one of the following games: video poker, video blackjack, video slots, video keno or video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo, said controller being programmed to determine a game event associated with the first video game, said controller being programmed to cause a second video image representing a second video game to be generated on said display unit according to the game event associated with the first video game, wherein the second video image is different than the first video image and the second video game ends after a predefined duration of time has elapsed, said controller being programmed to receive an input of the player by sensing a contact by the player to a touch-sensitive device to initiate animation of the second video image after the second video image is generated on the display unit, said controller being programmed to progressively animate the second video image without repetition according to the player's input to initiate animation until a separate input of the player to stop animation is received, wherein the separate input is a removal of the contact from the touch-sensitive device, said controller being programmed to receive the player's separate input to stop animation of the second video image, wherein the player's separate input is received before the predefined duration of time elapses, said controller being programmed to stop progressive animation of the second video image according to the player's separate input to stop animation, and said controller being programmed to determine a value payout to be associated with the second video game, wherein the value payout is based at least in part on a duration of the animation of the second video image.

2. The gaming apparatus according to claim 1, further comprising:

said controller being programmed to cause a first video image of a plurality of slot machine reels representing a first video game to be generated on said display unit, each of the slot machine reels including at least one reel symbol;

said controller being programmed to determine that a second video game initiator reel symbol should be displayed on at least one of the plurality of slot machine reels; and said controller being programmed to cause a second video image representing a second video game to be generated on said display unit according to the second video game initiator symbol associated with the first video game.

3. The gaming apparatus according to claim 1, further comprising:

said controller being programmed to determine a first game outcome associated with the first video game; and said controller being programmed to cause a second video image representing a second video game to be generated on said display unit according to the first game outcome associated with the first video game.

4. The gaming apparatus according to claim 1, further comprising:

said controller being programmed to determine if a unit of time has elapsed after the game event is determined; and said controller being programmed to initiate animation of the second video game image if the unit of time has elapsed.

5. The gaming apparatus according to claim 1, further comprising:

said controller being programmed to determine at least a portion of a payout to be associated with the second video game prior to animating the second video image.

6. The gaming apparatus according to claim 1, wherein the user input to stop animation is without prompting during progressive animation.

7. A gaming system comprising a plurality of gaming apparatuses as defined in claim 1, said gaming apparatuses being interconnected to form a network of gaming apparatuses.

8. A gaming system as defined in claim 7, wherein said gaming apparatuses are interconnected via the Internet.

9. A gaming apparatus, comprising:

a display unit that is capable of generating video images;

a value input device;

a controller operatively coupled to said display unit and said value input device, said controller comprising a processor and a memory operatively coupled to said processor, said controller being programmed to allow a player to make a wager;

said controller being programmed to cause a first video image to be generated on said display unit, said first video image representing a first video game, said controller being programmed to determine a game event associated with the first video game, said controller being programmed to cause a second video image representing a second video game to be generated on said display unit according to the game event associated with the first video game, wherein the second video game ends after a predefined duration of time has elapsed, said controller being programmed to receive an input of the player by sensing a contact by the player to a touch-sensitive device to initiate animation of the second video image after the second video image is generated on the display unit, said controller being programmed to progressively animate the second video image without repetition according to the player's input to initiate animation until a separate input of the player to stop animation is received, wherein the separate input is a removal of the contact from the touch-sensitive device, said controller being programmed to receive the player's separate input to stop animation of the second video image, wherein the player's separate input is received before the predefined duration of time elapses, said controller being programmed to stop progressive animation of the second video image according to the player's separate input to stop animation, said controller being programmed to determine if an amount of time has elapsed after animation of the second video image has been initiated by the player's input to initiate the animation, said controller being programmed to stop animation of the second video game image if the amount of time has elapsed, and said controller being programmed to determine a value payout to be associated with the second video game, wherein the value payout is based at least in part on a duration of the animation of the second video image.

10. The gaming apparatus according to claim 9, further comprising:

said controller being programmed to cause a first video image of a plurality of slot machine reels representing a first video game to be generated on said display unit, each of the slot machine reels including at least one reel symbol;

said controller being programmed to determine that a second video game initiator reel symbol should be displayed on at least one of the plurality of slot machine reels; and said controller being programmed to cause a second video image representing a second video game to be generated on said display unit according to the second video game initiator symbol associated with the first video game.

11. The gaming apparatus according to claim 9, further comprising:

said controller being programmed to determine a first game outcome associated with the first video game; and said controller being programmed to cause a second video image representing a second video game to be generated on said display unit according to the first game outcome associated with the first video game.

12. The gaming apparatus according to claim 9, further comprising:

said controller being programmed to determine if a unit of time has elapsed after the game event is determined; and said controller being programmed to initiate animation of the second video game image if the unit of time has elapsed.

13. The gaming apparatus according to claim 9, further comprising:

said controller being programmed to determine at least a portion of a payout to be associated with the second video game prior to animating the second video image.

14. The gaming apparatus according to claim 9, wherein the user input to stop animation is without prompting during progressive animation.

15. A gaming system, comprising a plurality of gaming apparatuses as defined in claim 9, said gaming apparatuses being interconnected to form a network of gaming apparatuses.

16. A gaming apparatus, comprising:

a display unit that is capable of generating video images;

a value input device;

a controller operatively coupled to said display unit and said value input device, said controller comprising a processor and a memory operatively coupled to said processor, said controller being programmed to allow a player to make a wager, said controller being programmed to allow the player to make a payline selection, said controller being programmed to cause a first video image to be generated on said display unit, said first video image comprising a plurality of simulated slot machine reels of a slots game, each of said slot machine reels having a plurality of slot machine symbols, said controller being programmed to determine a game event associated with the slots game, said controller being programmed to cause a second video image representing a second video game to be generated on said display unit according to the game event associated with the slots game, wherein the second video game ends after a predefined duration of time has elapsed, said controller being programmed to determine if an amount of time has elapsed after the game event is determined, said controller being programmed to receive an input of the player by sensing a contact by the player to a touch-sensitive device to initiate animation of the second video image after the second video image is generated on the display unit, said controller being programmed to progressively animate the second video image without repetition after the amount of time has elapsed or according to the player's input to initiate animation until a separate input of the player to stop animation is received, wherein the separate input is a removal of the contact from the touch-sensitive device, said controller being programmed to receive the player's separate input to stop animation of the second video image, wherein the player's separate input is received before the predefined duration of time elapses, said controller being programmed to stop progressive animation of the second video image according to the player's separate input to stop animation, and said controller being programmed to determine a value payout to be associated with the second video game, wherein the value payout is based at least in part on a duration of the animation of the second video image.

17. The gaming apparatus according to claim 16, further comprising:

said controller being programmed to determine that a second video game initiator reel symbol should be displayed on at least one of the plurality of slot machine reels; and said controller being programmed to cause a second video image representing a second video game to be generated on said display unit according to the second video game initiator symbol associated with the slots game.

18. The gaming apparatus according to claim 16, further comprising:

said controller being programmed to determine a slots game outcome associated with the slots game; and said controller being programmed to cause a second video image representing a second video game to be generated on said display unit according to the slots game outcome associated with the slots game.

19. The gaming apparatus according to claim 16, further comprising:

said controller being programmed to determine at least a portion of a payout to be associated with the second video game prior to animating the second video image.

20. A gaming apparatus as defined in claim 16 wherein said controller is programmed to allow a user to select a number of paylines.

21. The gaming apparatus according to claim 16, wherein the user input to stop animation is without prompting during progressive animation.

22. A gaming system comprising a plurality of gaming apparatuses as defined in claim 16, said gaming apparatuses being interconnected to form a network of gaming apparatuses.

23. A gaming method comprising:

receiving a wager;

causing a first video image representing a first video game to be generated on a display unit, said video image representing one of the following games: video poker, video blackjack, video slots, video keno or video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, and said video image comprising an image of a bingo grid if said game comprises video bingo; and determining a game event associated with the first video game;

causing a second video image representing a second video game to be generated on said display unit according to the game event associated with the first video game, wherein the second video image is different than the first video image and the second video game ends after a predefined duration of time has elapsed;

receiving an input of a player by sensing a contact by the player to a touch-sensitive device to initiate animation of the second video image after the second video image is generated on the display unit;

progressively animating the second video image without repetition according to the player's input to initiate animation until a separate input of the player to stop animation is received, wherein the separate input is a removal of the contact from the touch-sensitive device;

receiving the player's separate input to stop animation of the second video image, wherein the player's separate input is received before the predefined duration of time elapses;

stopping progressive animation of the second video image according to the player's separate input to stop animation; and determining a value payout to be associated with the second video game based at least in part on a duration of the animation of the second video image.

24. The gaming method according to claim 23, further comprising:

causing a first video image of a plurality of slot machine reels representing a first video game to be generated on a display unit, each of the slot machine reels including at least one reel symbol;

determining that a second video game initiator reel symbol should be displayed on at least one of the plurality of slot machine reels; and causing a second video image representing a second video game to be generated on a display unit according to the second video game initiator symbol associated with the first video game.

25. The gaming method according to claim 23, further comprising:

determining a first game outcome associated with the first video game; and causing a second video image representing a second video game to be generated on a display unit according to the first game outcome associated with the first video game.

26. The gaming method according to claim 23, further comprising:

determining if a unit of time has elapsed after the game event is determined; initiating animation of the second video game image if the unit of time has elapsed.

27. The gaming method according to claim 23, further comprising:

determining at least a portion of a payout to be associated with the second video game prior to animating the second video image.

28. The gaming method according to claim 23, wherein the user input to stop animation is without prompting during progressive animation.

29. A gaming method comprising:

receiving a wager;

causing a first video image representing a first video game to be generated on a display unit;

determining a game event associated with the first video game;

causing a second video image representing a second video game to be generated on a display unit according to the game event associated with the first video game, wherein the second video game ends after a predefined duration of time has elapsed;

receiving an input of a player by sensing a contact by the player to a touch-sensitive device to initiate animation of the second video image after the second video image is generated on the display unit;

progressively animating the second video image without repetition according to the player's input to initiate animation until a separate input of the player to stop animation is received, wherein the separate input is a removal of the contact from the touch-sensitive device;

receiving the player's separate input to stop animation of the second video image, wherein the player's separate input is received before the predefined duration of time elapses;

stopping progressive animation of the second video image according to the player's separate input to stop animation;

determining if an amount of time has elapsed after animation of the second video image has been initiated by the player's input to initiate the animation;

stopping progressive animation of the second video game image if the amount of time has elapsed; and determining a value payout to be associated with the second video game based at least in part on a duration of the animation of the second video image.

30. The gaming method according to claim 29, further comprising:

causing a first video image of a plurality of slot machine reels representing a first video game to be generated on a display unit, each of the slot machine reels including at least one reel symbol;

determining that a second video game initiator reel symbol should be displayed on at least one of the plurality of slot machine reels; and causing a second video image representing a second video game to be generated on a display unit according to the second video game initiator symbol associated with the first video game.

31. The gaming method according to claim 29, further comprising:

determining if a unit of time has elapsed after the game event is determined; and initiating animation of the second video game image if the unit of time has elapsed.

32. The gaming method according to claim 29, further comprising:

determining at least a portion of a payout to be associated with the second video game prior to animating the second video image.

33. The gaming method according to claim 29, wherein the user input to stop animation is without prompting during progressive animation.

34. A gaming method comprising:

receiving a wager;

receiving a payline selection, causing a first video image representing a first video game to be generated on a display unit, said video image comprising a plurality of simulated slot machine reels of a slots game, each of said slot machine reels having a plurality of slot machine symbols, determining a game event associated with the first video game;

causing a second video image representing a second video game to be generated on a display unit according to the game event associated with the first video game, wherein the second video game ends after a predefined duration of time has elapsed;

determining if an amount of time has elapsed after the game event is determined;

receiving an input of a player by sensing a contact by the player to a touch-sensitive device to initiate animation of the second video image after the second video image is generated on the display unit;

progressively animating the second video image without repetition after the amount of time has elapsed or according to the player's input to initiate animation until a separate input of the player to stop animation is received, wherein the separate input is a removal of the contact from the touch-sensitive device;

receiving the player's separate input to stop animation of the second video image, wherein the player's separate input is received before the predefined duration of time elapses;

stopping progressive animation of the second video image according to the player's separate input to stop animation; and determining a value payout to be associated with the second video game based at least in part on a duration of the animation of the second video image.

35. The gaming method according to claim 34, further comprising:

causing a first video image of a plurality of slot machine reels representing a first video game to be generated on a display unit, each of the slot machine reels including at least one reel symbol;

determining that a second video game initiator reel symbol should be displayed on at least one of the plurality of slot machine reels; and causing a second video image representing a second video game to be generated on a display unit according to the second video game initiator symbol associated with the first video game.

36. The gaming method according to claim 34, further comprising:

determining a first game outcome associated with the first video game; and causing a second video image representing a second video game to be generated on a display unit according to the first game outcome associated with the first video game.

37. The gaming method according to claim 34, further comprising:

determining if a unit of time has elapsed after the game event is determined; and initiating animation of the second video game image if the unit of time has elapsed.

38. The gaming method according to claim 34, further comprising:

determining at least a portion of a payout to be associated with the second video game prior to animating the second video image.

39. The gaming method according to claim 34, wherein the user input to stop animation is without prompting during progressive animation.

* * * * *